United States Patent
Yamauchi

(10) Patent No.: US 7,272,146 B2
(45) Date of Patent: Sep. 18, 2007

(54) MPLS-VPN SERVICE NETWORK

(75) Inventor: Toshiro Yamauchi, Tokyo (JP)

(73) Assignee: NEC Corporation, Tokyo (JP)

( * ) Notice: Subject to any disclaimer, the term of this patent is extended or adjusted under 35 U.S.C. 154(b) by 1096 days.

(21) Appl. No.: 09/945,754

(22) Filed: Sep. 5, 2001

(65) Prior Publication Data

US 2002/0037010 A1     Mar. 28, 2002

(30) Foreign Application Priority Data

Sep. 28, 2000    (JP)    ............................. 2000-296324

(51) Int. Cl.
*H04L 12/28*    (2006.01)
(52) U.S. Cl. ................. 370/395.53; 370/465; 370/466
(58) Field of Classification Search ................ 370/401, 370/466, 465, 395.53
See application file for complete search history.

(56) References Cited

U.S. PATENT DOCUMENTS

| | | | |
|---|---|---|---|
| 5,768,271 A | 6/1998 | Seid et al. ................... 370/389 |
| 5,825,772 A * | 10/1998 | Dobbins et al. ............ 370/396 |
| 6,205,488 B1 * | 3/2001 | Casey et al. ................. 709/238 |
| 6,466,578 B1 * | 10/2002 | Mauger et al. ........... 370/395.3 |
| 6,477,166 B1 * | 11/2002 | Sanzi et al. .............. 370/395.1 |
| 6,510,135 B1 * | 1/2003 | Almulhem et al. ......... 370/229 |
| 6,560,654 B1 * | 5/2003 | Fedyk et al. ................ 709/239 |
| 6,633,571 B1 * | 10/2003 | Sakamoto et al. .......... 370/401 |
| 6,674,756 B1 * | 1/2004 | Rao et al. ............... 370/395.21 |
| 6,683,874 B1 * | 1/2004 | Nagami et al. ............. 370/392 |
| 6,765,921 B1 * | 7/2004 | Stacey et al. ................ 370/401 |
| 6,771,662 B1 * | 8/2004 | Miki et al. ................... 370/469 |
| 6,775,239 B1 * | 8/2004 | Akita et al. ................. 370/248 |
| 6,778,494 B1 * | 8/2004 | Mauger ....................... 370/230 |
| 6,778,498 B2 * | 8/2004 | McDysan .................... 370/231 |
| 6,886,043 B1 * | 4/2005 | Mauger et al. ............. 709/238 |
| 6,937,574 B1 * | 8/2005 | Delaney et al. ............. 370/254 |

FOREIGN PATENT DOCUMENTS

| | | |
|---|---|---|
| JP | 10-56481 | 2/1998 |
| JP | 11-191776 | 7/1999 |
| JP | 11-266278 | 9/1999 |
| JP | 2000-138711 | 5/2000 |

* cited by examiner

*Primary Examiner*—Wing Chan
*Assistant Examiner*—Andrew C. Lee
(74) *Attorney, Agent, or Firm*—Foley & Lardner LLP

(57) ABSTRACT

An MPLS-VPN (MultiProtocol Label Switching-Virtual Private Network) service network of the present invention includes an interface identifying device. The Interface identifying device includes a virtual router belonging to a preselected VPN and an MPLS label operating section for stacking or removing MPLS labels on or from an IP packet received from the virtual router. The label operating section is made up of a first-stage label operating section for stacking on an IP packet received from a customer an MPLS label for transferring the packet over the network and a second-stage MPLS label operating section for executing label operation for identifying a virtual interface. The network constructs a virtual interface at each virtual router for allowing a routing protocol to operate between user sites that belong to the same VPN.

19 Claims, 6 Drawing Sheets

MPLS-VPN SERVICE NETWORK

BACKGROUND OF THE INVENTION

1. Field of the Invention

The present invention relates to a network for providing MPLS-VPN (MultiProtocol Label Switching-Virtual Private Network) services and more particularly to a method and a device for identifying the interface of a virtual router.

2. Description of the Background Art

Today, a VPN virtually implementing, e.g., a company network on an IP (Internet Protocol) network is attracting increasing attention. Particularly, a MPLS-VPN using MPLS easily provides a VPN solution for supporting private addresses while securing customer data.

However, a conventional MPLS-VPN system has a problem that an OSPF (Open Shortest Path First), an RIP (Routing Information Protocol) and other existing routing protocols cannot operate between VPN user sites via virtual routers. Another problem is that label merging and penultimate hop popping are not practicable within an MPLS network.

Technologies relating to the present invention are disclosed in, e.g., Japanese Patent Laid-Open Publication Nos. 10-56481, 11-191776, 11-266278 and 2000-138711.

SUMMARY OF THE INVENTION

It is an object of the present invention to provide an MPLS-VPN system that allows the OSPF, RIP and other existing routing protocols to operate between VPN user sites via virtual routers and allows label merging and penultimate hop popping to be executed in an MPLS network.

It is another object of the present invention to provide a method and a device for identifying the interface of a virtual router included in an MPLS-VPN system.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

To better understand the present invention, brief reference will be made to a specific configuration of a conventional network for providing MPLS-VPS services, shown in FIG. 1. Generally, an MPLS-VPN service network provides VPN construction services by using MPLS for network layer routing. MPLS allows a VPN identifying label to be set at each of PE (Provider Edge) routers, which are network units located at the inlet and outlet of an MPLS-VPS service network, and thereby facilitates the construction of a VPN.

Figure 1:
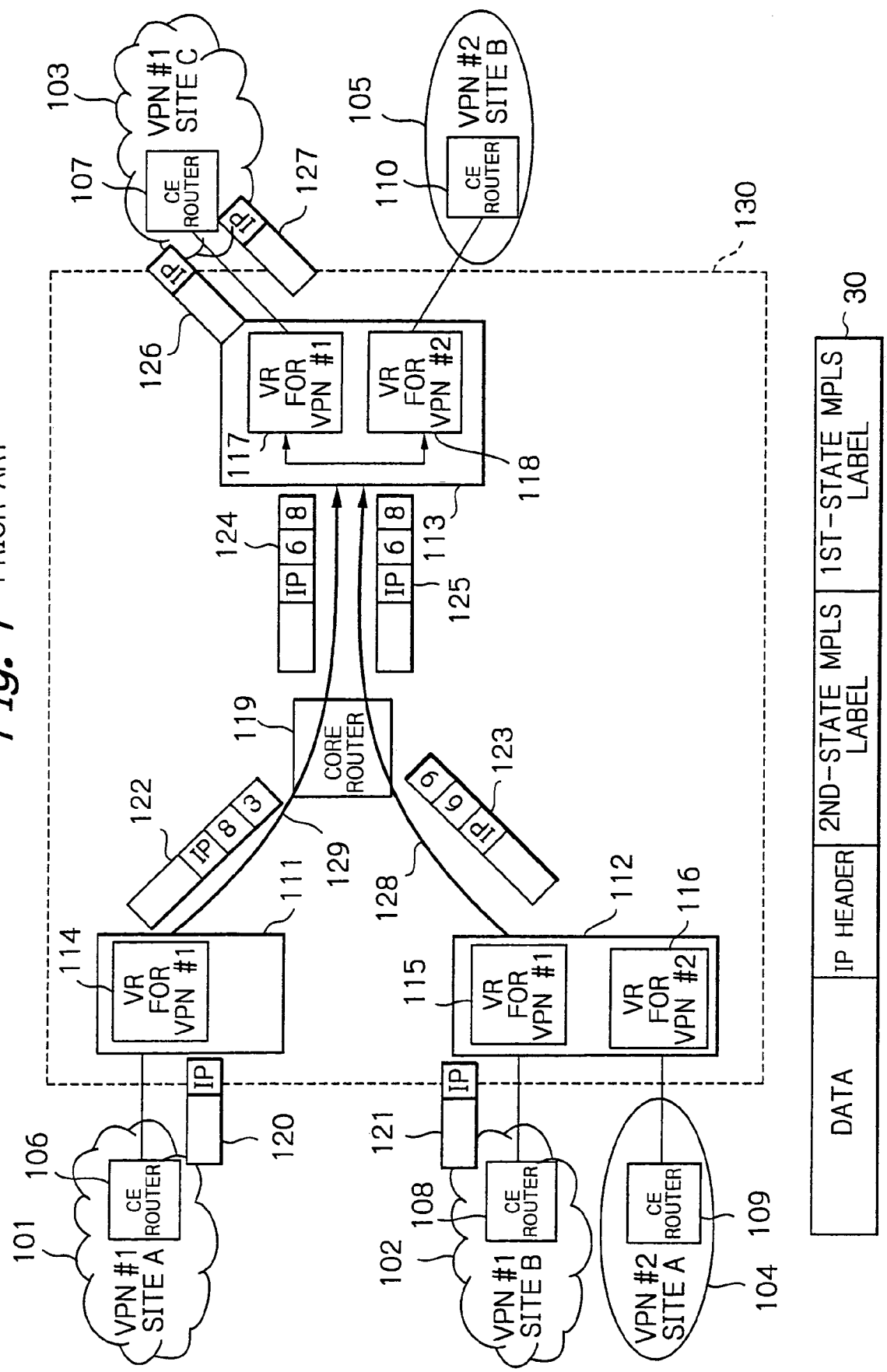
FIG. 1 is a schematic block diagram showing a conventional MPLS-VPN service network.

As shown in FIG. 1, the conventional MPLS-VPS service network includes PE routers 111, 112 and 113. The PE routers 111, 112 and 113 respectively include VRs (Virtual Routers) 114, 115 and 117 assigned to VPN #1 sites 101 (A), 102 (B) and 103 (C), respectively. The PE routers 112 and 113 further include VRs 116 and 118, respectively, that are assigned to VPN #2 sites 104 and 105. The PE routers 111 through 113 are included in an MPLS-VPN service network 130 together with a core router 119, which will be described later.

While a VR is, in practice, a function mounted on a single PE router, it refers to a process or a construction for routing packets received VPN by VPN. A VR transfers packets by referencing routing tables each being assigned to a particular VPN. More particularly, each VR operates by referencing a routing table assigned to a VPN to which the VR belongs. LSPs (Label Switching Paths) 128 and 129 are respectively constructed between the PE routers 112 and 113 and between the PE routes 111 and 113.

When a packet 120 sent from the VPN #1 site 101 enters the MPLS-VPN service network 130, the PE router 111 determines a destination in accordance with a routing table stored in the VR 114. The PE router 111 then encapsulates the packet in a format 30 in accordance with the destination. The format 30 is made up of data, an IP header, a second-stage MPLS label, and a first-stage MPLS label. The PE router 111 stacks a label for identifying the VPN #1 on the second MPLS label and stacks a label for transfer along the LSP 129 and meant for the PE router 113 on the first-stage label.

The encapsulated packet, labeled 122, is transferred from the PE router 111 to the core router 119. The core router 119 executes label switching on the basis of the first-stage MPLS label of the packet 122, i.e., replaces the first-stage MPLS label. The core router 119 then transfers the resulting packet 124 to the PE router 113. The PE router 113 removes the first-stage and second-stage MPLS labels from the packet 124, determines that the packet 124 is meant for the VPN #1 by referencing the second-stage MPLS label, and then delivers the packet to the VR 117. In response, the VR 117 transfers a packet 126 to the user VPN site 103 by referencing a routing table stored therein. In this manner, the conventional network implements a MPLS-VPN service. The MPLS-VPN service network 130 additionally includes CE (Customer Edge) routers 106 through 110.

The conventional MPLS-VPN service network 130 has the following problems left unsolved. Assume that the core router 119 merges the packet 122 received from the VR 114 of the PE router 111 and a packet 123 received from the VR 115 of the PE router 112 and then transfers them to the PE router in the form of packets 124 and 125, respectively. Then, the PE router 113 cannot identify the routers that have sent the packets 124 and 125. This prevents each VR from accurately updating routing table information and guaranteeing bidirectional communication when a routing protocol operates on the VR.

Further, a routing protocol cannot operate on the VRs unless a bidirectional link is available between the VRs. That is, each VR must include a virtual interface interfacing the VR to another VR. Because the virtual interface is bidirectional, the VR receiving a packet is required to identify an interface for which the packet is meant. In this respect, the fact that one VR cannot identify another VR that has sent a packet is a critical problem. This is also true when a router immediately preceding a PE router executes penultimate hop popping for removing the first-stage MPLS label. Specifically, a core router immediately preceding a PE router, which is located at the outlet of an MPLS-VPN service network, executes penultimate hop popping for decapsulating an MPLS label.

Figure 2:
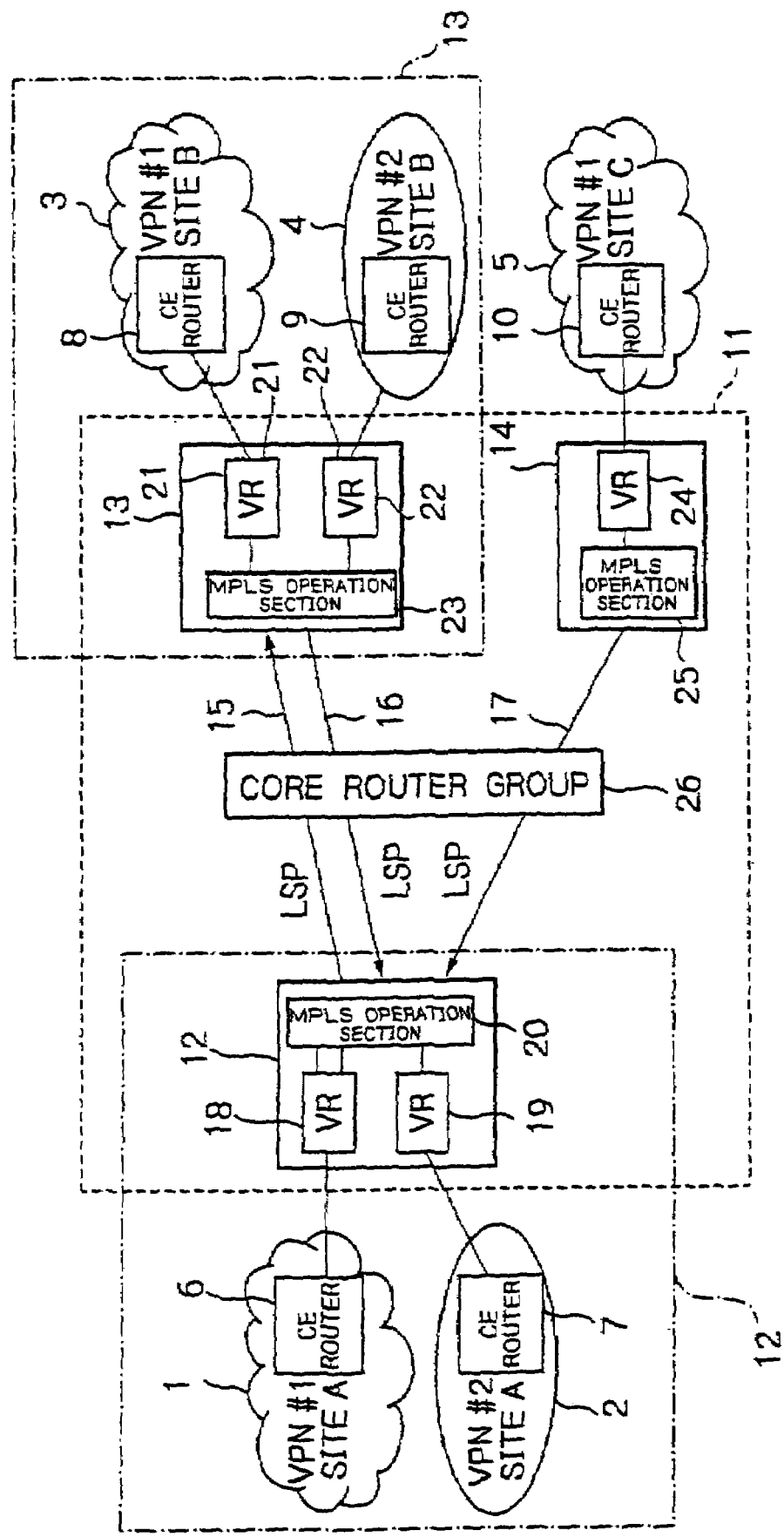
FIG. 2 is a schematic block diagram showing an MPLS-VPN service network embodying the present invention.

Referring to FIG. 2, a network for providing MPLS-VPN services embodying the present invention is shown. As shown, the MPLS-VPN service network, generally 11, includes PE routers 12, 13 and 14 and a group of core routers 26. The PE router 12 accommodates a VPN #1 site 1 (A) and a VPN #2 site 2 (A) connected to CE routers 6 and 7, respectively. The PE router 12 has VRs 18 and 19 thereinside that are assigned to the VPNs #1 and #2, respectively. Likewise, the PE router 13 accommodates a VPN #1 site 3 (B) and a VPN #2 site 4 (B) connected to CE routers 8 and 9, respectively. The PE router 13 has VRs 21 and 22 thereinside that are assigned to the VPNs #1 and #2, respectively. Further, The PE router 14 accommodates a VPN #1 site 5 (C) connected to a CE router 10 and has a VR 24 thereinside that is assigned to the VPN #1. The PE routers 12, 13 and 14 additionally include MPLS operating sections 20, 23 and 25, respectively.

LSPs are constructed between the PE routers beforehand. Specifically, an LSP 15 extends from the PE router 12 to the PE router 13 while an LSP 16 extends from the latter to the former. Further, an LSP 17 extends from the PE router 14 to the PE router 12.

Figure 3:
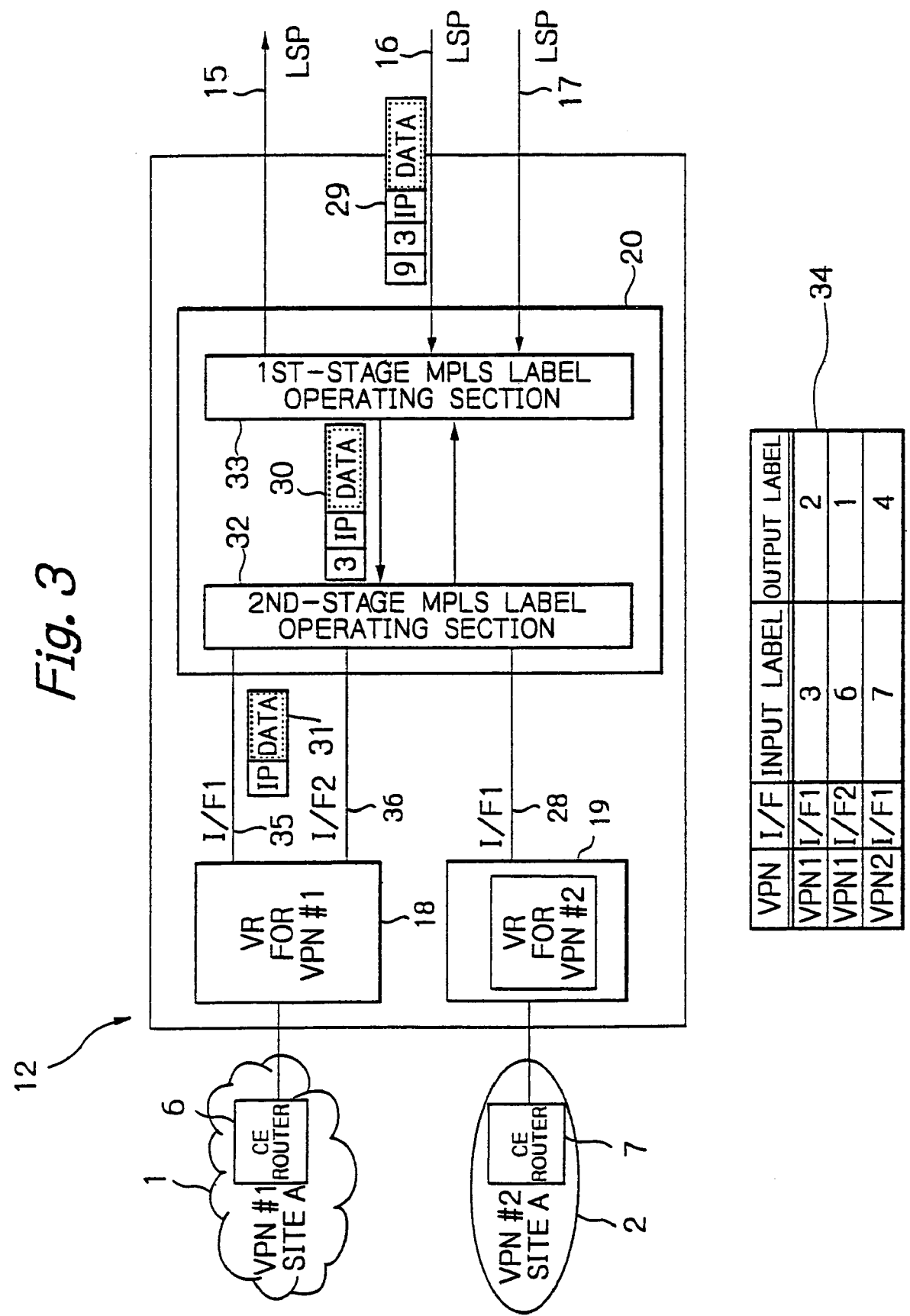
FIG. 3 is a schematic block diagram showing a specific configuration of a provider edge router located at the inlet of the network of the illustrative embodiment.

FIG. 3 shows the PE router 12 including the VRs 18 and 19 and MPLS operating section 20 in detail. As shown, the MPLS operating section 20 is made up of a second-stage and a first-stage MPLS label operating section 32 and 33, respectively. The VR 18 assigned to the VPN #1 user has two interfaces 35 and 36 (I/F1 and I/F2). The other VR 19 assigned to the VPN #2 user has a single interface 28 (I/F1). The second-stage MPLS label operating section 32 stores a table 34 listing a relation between the interfaces I/F1 and I/F2 and the second-stage MPLS labels.

Figure 4:
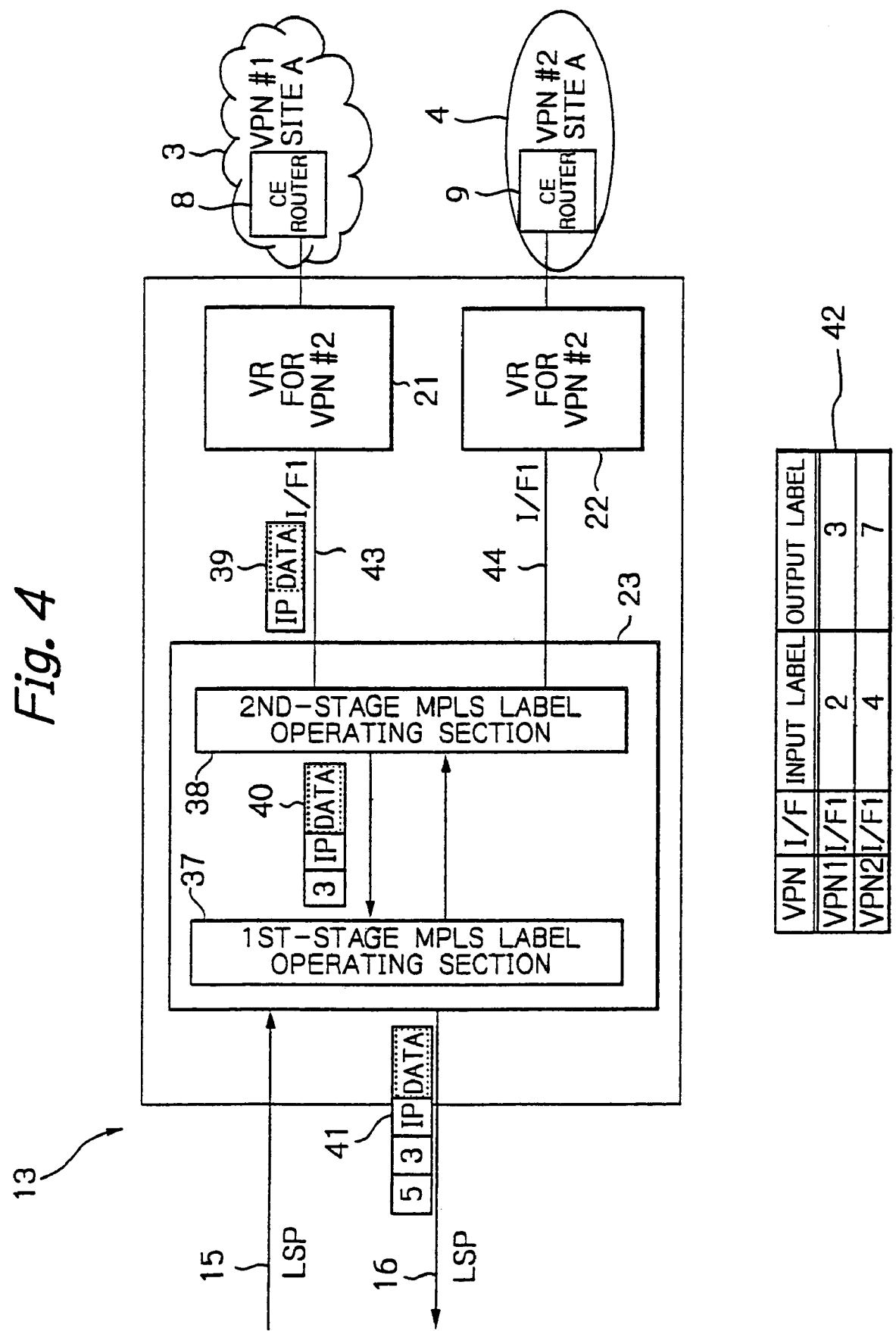
FIG. 4 is a schematic block diagram showing a specific configuration of a provider edge router located at the outlet of the network of the illustrative embodiment.

FIG. 4 shows the PE router 13 including the VRs 21 and 22 assigned to the VPNs #1 and #2, respectively, and MPLS operating section 23 in detail. As shown, the MPLS operating section 23 has a second-stage MPLS label operating section 38 and a first-stage MPLS label operating section 37. The VRs 21 and 22 have interfaces 43 and 44, respectively. The second MPLS label operating section 38 stores a table 42 listing a relation between the interface I/F1 and the second MPLS labels.

A specific operation of the illustrative embodiment will be described hereinafter. First, an LSP is constructed between the PE routers. Specifically, a particular label is distributed to each of the PE router 12, core router group 26 and PE routers 13 on the basis of configuration information set by an operator and an LDP (Label Distribution Protocol) so as to construct an LSP, which is a logical path for transferring a packet with a label. The LDP is a protocol for distributing labels between communication nodes. For details of the LDP, reference may be made to LDP specifications based on IETF (Internet Engineers Task Force) standards.

Subsequently, the interfaces 35 and 36 are registered at the VR 18 included in the PE router 12 as a bidirectional interfaces connected to the VR of the PE router 13 and a bidirectional interface connected to the VR 24 of the PE router 14, respectively. A registration procedure will be described hereinafter.

Labels for the interfaces are distributed between the PE routers and 13 by the LDP using a configuration or a target cession. More specifically, the PE router 12 sends a label "3" identifying the interface 35 of the VR 18 to the PE router 13. Likewise, the PE router 13 sends a label "2" identifying the interface 43 of the VR 21 to the PE router 12. The PE router 12 registers the labels "3" and "2" as an input label and an output label, respectively, while relating them to the interface 35 of the VR 18. Consequently, the list 34, FIG. 3, is stored in the PE router 12.

The PE router 13 registers the labels "2" and "3" as an input label and an output label, respectively, while relating them to the interface 43 of the VR 21. As a result, the list 42 is stored in the PE router 13.

Assume that a packet is sent from the VR 21 to the VR 18. Then, the VR 21 sends a packet 39 to the second-stage MPLS label operating section 38. The MPLS label operating section 38 stacks the output label "3" of the interface 43 on the packet 39 to thereby produce a packet 40 and then delivers the packet 40 to the first-stage MPLS label operating section 37. The label operating section MPLS 37 stacks a label "5" meant for the PE router 12 on the packet 40 and sends the resulting packet 41 to the core router group 26. The core router group 26 transfers the packet 41 to the PE router 12. At this instant, the core router group 26 replaces the first-stage MPLS label every time the latter is transferred via the former, thereby effecting label merging or penultimate hop popping. However, the core router group 26 does not change the second-stage MPLS label at all.

In the PE router 12 received the packet, the first-stage MPLS label operating section 33 removes the first-stage MPLS label and sends the resulting packet 30 to the second-stage MPLS label operating section 32. The second-state MPLS label operating section 32 removes the second-stage MPLS label from the packet 30 and then sends the resulting packet 31 to the interface 35 of the VR 18 in accordance with the table 34. The VR 18 can therefore identify the interface at which the packet has arrived.

Assume that the VR 18 sends a packet meant for the VR 214 to the interface 35. Then, the MPLS operating section 20 stacks a label meant for the interface 43 of the VR 21 and a label meant for the PE router 13 on the above packet. The resulting packet is sent to the VR 21 via the MPLS-VPN service network 11 although not shown specifically. By the procedure described above, bidirectional interfaces are set up between the VRs 18 and 21 and allow the routine protocol to operate on the VRs 18 and 21.

Figure 5:
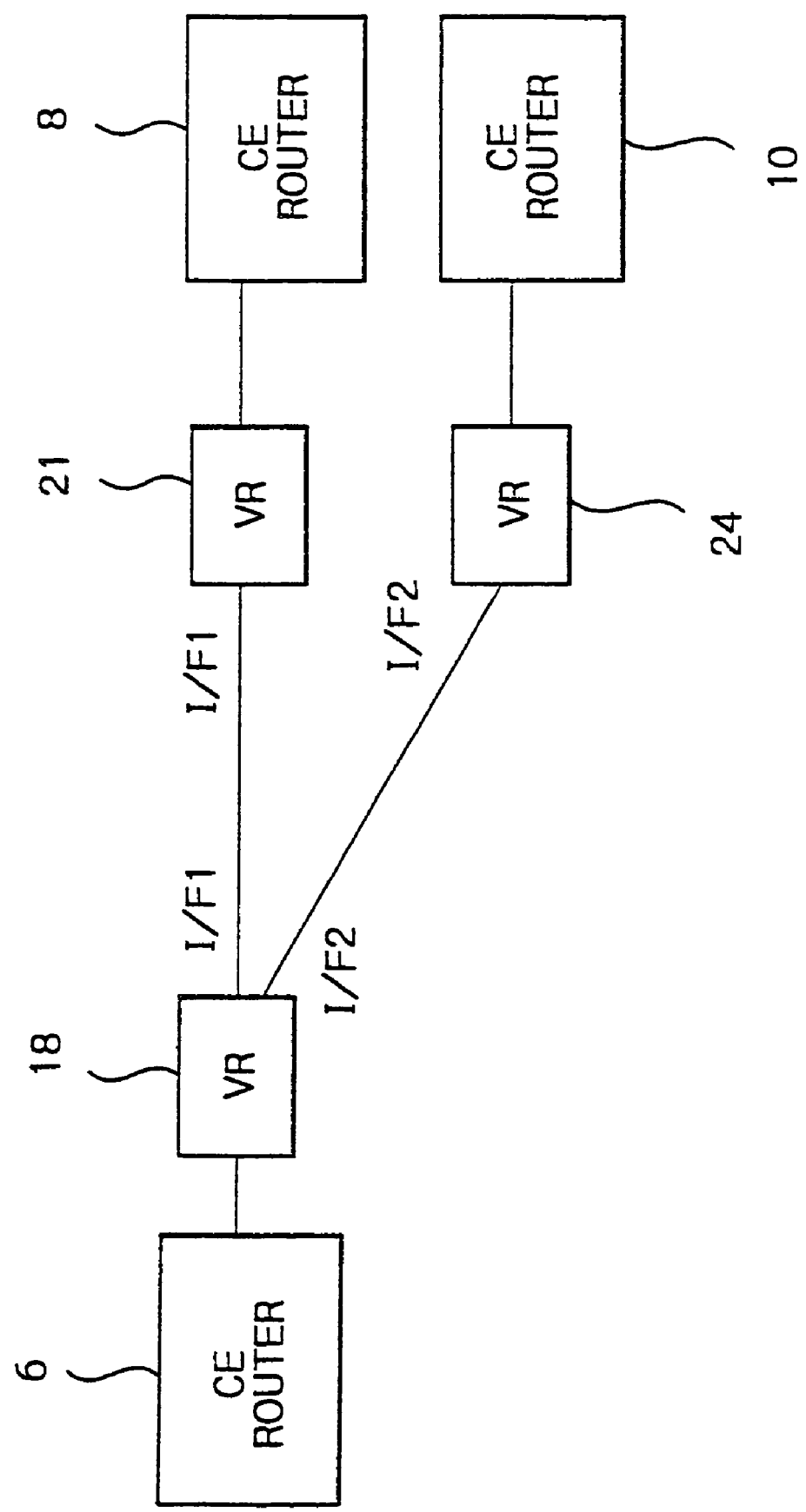
FIG. 5 is a schematic block diagram showing the logical configuration of the network as seen from the VPN user side.

FIG. 5 shows the network as seen from the VPN #1 user side. As shown, an input and an output interface can be identified on the basis of information corresponding to an input and an output label. It follows that an interface to which a packet is meant for can be determined even if label merging or penultimate hop popping is executed with the first-stage LSP label.

Figure 6:
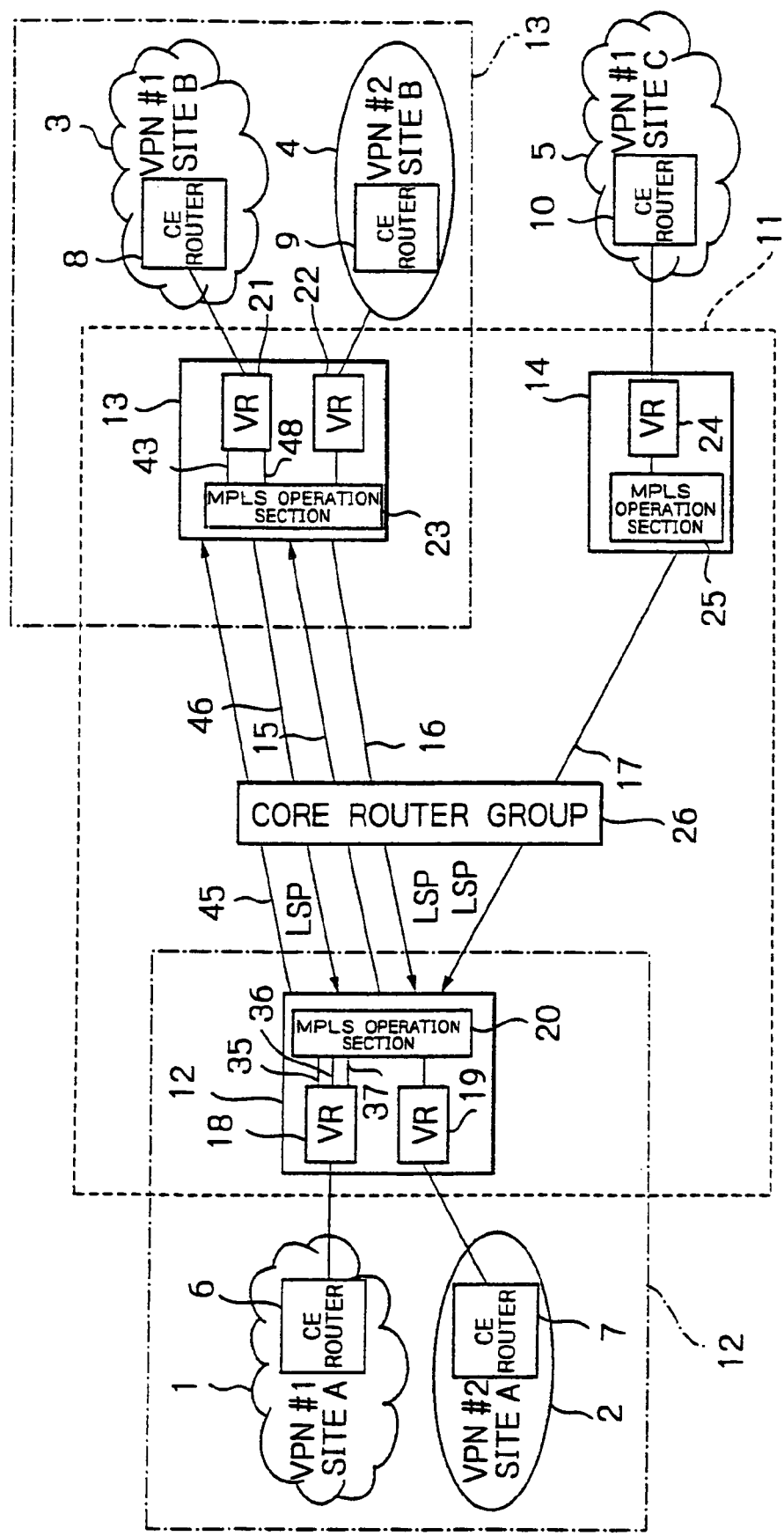
FIG. 6 is a schematic block diagram showing an alternative embodiment of the present invention.

Reference will be made to FIG. 6 for describing an alternative embodiment of the present invention. While the illustrative embodiment is identical with the previous embodiment as to the basic construction, it has an additional function as to the kind of an interface. Specifically, as shown in FIG. 6, the illustrative embodiment additionally includes LSPs 45 and 46 between the PE routers 12 and 13 and interfaces 37 and 48 respectively assigned to the VRs 18 and 21.

The LSP 45 extending from the PE router 12 to the PE router 13 and the LSP 46 extending from the latter to the former are constructed independently of the LSPs 15 and 16, respectively. More specifically, the LSPs 45 and 46 differ from the LSPs 15 and 16 as to OS (Quality Of Service) or the route. The interfaces 37 and 48 are newly registered at the VR 18 in order to distribute labels between the PE routers 12 and 13.

When the VR 18 sends a packet via the interface 37, the PE router 12 stacks labels respectively meant for the interface 48 of the VR 21 and LSP 45 on the packet and sends the resulting packet. Likewise, when the VR 21 sends a packet via the interface 48, the PE router 13 stacks labels respectively meant for the interface 37 of the VR 18 and LSP 46 and sends the resulting packet. This successfully sets up a plurality of interfaces different in QOS or route between the VRs 18 and 21.

In summary, in accordance with the present invention, an MPLS-VPN service network provides each VR with a virtual bidirectional interface and thereby allows a routing protocol to operate between user sites belonging to the same VPN via VRs. Further, because the network identifies an interface by using the second-stage MPLS label, label merging or penultimate hop popping can be executed with the first-stage MPLS label. Moreover, LSPs can be set up even in a construction including a plurality of interfaces different in QOS or route between two VRs, thereby providing an MPSL-VPS service.

Various modifications will become possible for those skilled in the art after receiving the teachings of the present disclosure without departing from the scope thereof.

What is claimed is:

1. In an MPLS-VPN (MultiProtocol Label Switching-Virtual Private Network) system for providing VPN services by using MPLS, an interface identifying device comprising:
   a plurality of virtual routers, a first virtual router of the plurality of virtual routers capable of processing IP (Internet Protocol) packets received via a plurality of particular virtual interfaces that belong to a same VPN, the first virtual router capable of transmitting IP packets through the plurality of particular virtual interfaces; and
   an MPLS label operating device for processing label information for transferring a received IP packet over an MPLS-VPN service network, said MPLS label operating device including:
      a first-stage MPLS label operating section for stacking on the IP packet a first-stage MPLS label for transferring said IP packet over the MPLS-VPN service network; and
      a second-stage MPLS label operating section for stacking on the IP packet a second-stage MPLS label for identifying one of a plurality of virtual interfaces;
   wherein the MPLS label operating device is connected to receive IP packets transmitted by the first virtual router through each of the plurality of particular virtual interfaces; and
   wherein the second-stage MPLS label operating section is configured such that, when the MPLS label operating device receives a particular IP packet that has been transmitted by the first virtual router, the second-stage MPLS label operating section determines a particular second-stage MPLS label of a plurality of second-stage MPLS labels to stack onto the particular IP packet based on which one of the plurality of particular virtual interfaces the first virtual router used to transmit the particular IP packet.

2. The device as claimed in claim 1, wherein said second-stage MPLS label operating section is configured to execute label processing by referencing information representative of a correspondence between the plurality of virtual interfaces and the plurality of second-stage MPLS labels.

3. The device as claimed in claim 2, wherein the information includes an interface-by-interface input label and an interface-by-interface output label.

4. The device as claimed in claim 1, wherein said interface identifying device is configured to communicate with a customer edge router that executes routing of IP packets in a VPN site connected to a user terminal.

5. The device as claimed in claim 4, wherein said interface identifying device further comprises:
   means for setting a label switching path in accordance with QOS (Quality Of Service) information; and
   means for setting a virtual interface corresponding to the label switching path.

6. The device as claimed in claim 4, wherein said interface identifying device further comprises:
   means for setting a label switching path in accordance with a route via which a packet is transferred; and
   means for setting a virtual interface corresponding to the label switching path.

7. The device as claimed in claim 1, wherein the plurality of virtual interfaces include the plurality of particular virtual interfaces.

8. The device as claimed in claim 1, wherein the MPLS label operating device is configured to associate each of the plurality of particular virtual interfaces with a corresponding unique second-stage MPLS label of the plurality of second-stage MPLS labels.

9. A router, comprising:
   a plurality of virtual routers, each virtual router of the plurality of virtual routers having one or more interfaces of a plurality of interfaces at which packets may be received, a first virtual router of the plurality of virtual routers having a plurality of particular interfaces that belong to a same virtual private network, the plurality of interfaces including the plurality of particular interfaces; and
   an MPLS operating section for storing a table that lists for each second-stage MPLS label of a plurality of second-stage MPLS labels an associated interface of the plurality of interfaces;
   wherein the MPLS operating section is configured to receive a packet along with a second-stage MPLS label that has been stacked onto the packet, and is configured to determine using the table a specific interface of the plurality of interfaces that is associated with the second-stage MPLS label, and is configured to transmit the packet to a virtual router of the plurality of virtual routers that has the specific interface.

10. The router of claim 9, wherein the MPLS operating section is configured to receive the packet along with the second-stage MPLS label and along with a first-stage MPLS label that has been stacked onto the packet, the first-stage MPLS label having been used to route the packet to the router.

11. The router of claim 9, wherein the first virtual router is configured to identify, when the first virtual router receives a particular packet, an interface of the plurality of particular interfaces at which the particular packet arrived.

12. The router of claim 11, wherein the first virtual router is configured to determine a particular virtual router that sent the particular packet based on the identified interface at which the particular packet arrived.

13. A method in a router, the router comprising a plurality of virtual routers and an MPLS operating section, a first virtual router of the plurality of virtual routers capable of processing packets received via a plurality of particular virtual interfaces that belong to a same VPN and capable of transmitting packets through the plurality of particular virtual interfaces, the MPLS operating section connected to receive packets transmitted by the first virtual router through each of the plurality of particular virtual interfaces, the method comprising:

receiving, by the MPLS operating section, a particular packet that has been transmitted by the first virtual router;

determining, by the MPLS operating section, a particular second-stage MPLS label of a plurality of second-stage MPLS labels to stack onto the particular packet based on which one of the plurality of particular virtual interfaces the first virtual router used to transmit the particular packet;

stacking onto the particular packet, by the MPLS operating section, the determined particular second-stage MPLS label; and stacking onto the particular packet, by the MPLS operating section, a first-stage MPLS label for transferring the particular packet over a network.

14. The method of claim 13, wherein said determining step, comprises:

referencing, by the MPLS operating section, information in a table representative of a correspondence between the plurality of particular virtual interfaces and the plurality of second-stage MPLS labels; and determining, by the MPLS operating section using the referenced information in the table, the particular second-stage MPLS label of the plurality of second-stage MPLS labels to stack onto the particular packet based on which one of the plurality of particular virtual interfaces the first virtual router used to transmit the particular packet.

15. The method of claim 13, wherein the information in the table includes a respective unique input label for each of the plurality of particular virtual interfaces and a respective unique output label for each of the plurality of particular virtual interfaces.

16. A method in a router, the router comprising a plurality of virtual routers and an MPLS operating section, each virtual router of the plurality of virtual routers having one or more interfaces of a plurality of interfaces at which packets may be received, a first virtual router of the plurality of virtual routers having a plurality of particular interfaces that belong to a same virtual private network, the plurality of interfaces including the plurality of particular interfaces, the method comprising:

storing, in the MPLS operating section, a table that lists for each second-stage MPLS label of a plurality of second-stage MPLS labels an associated interface of the plurality of interfaces;

receiving, by the MPLS operating section, a packet along with a second-stage MPLS label that has been stacked onto the packet;

determining, by the MPLS operating section using the table, a specific interface of the plurality of interfaces that is associated with the second-stage MPLS label; and transmitting, by the MPLS operating section, the packet to a virtual router of the plurality of virtual routers that has the specific interface.

17. The method of claim 16, wherein said receiving comprises:

receiving, by the MPLS operating section, the packet along with the second-stage MPLS label and along with a first-stage MPLS label that has been stacked onto the packet, the first-stage MPLS label having been used to route the packet to the router.

18. The method of claim 16, further comprising:

identifying, by the first virtual router when the first virtual router receives a particular packet, an interface of the plurality of particular interfaces at which the particular packet arrived.

19. The method of claim 18, further comprising:

determining, by the first virtual router, a particular virtual router that sent the particular packet based on the identified interface at which the particular packet arrived.

* * * * *